United States Patent Office 3,705,012
Patented Dec. 5, 1972

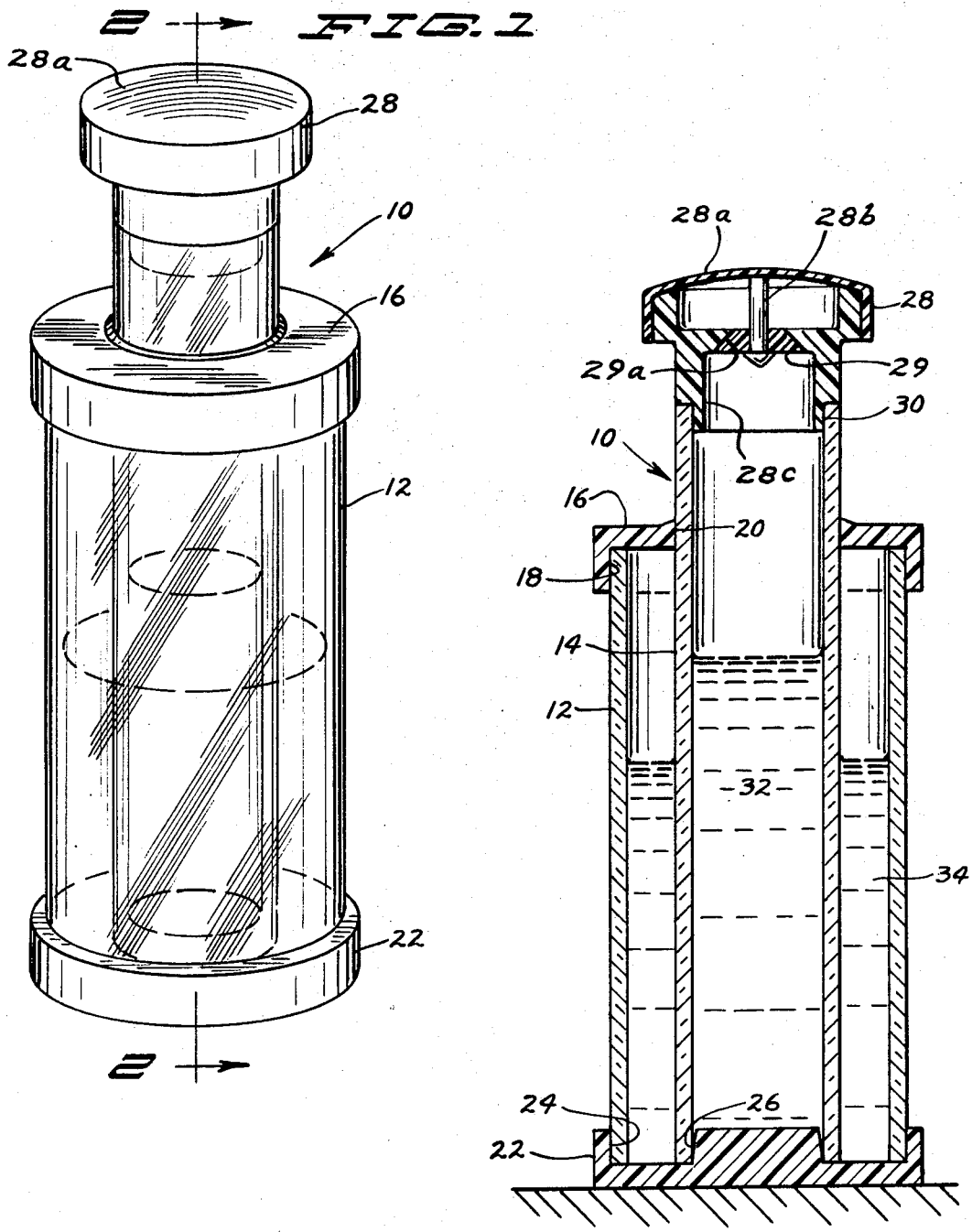

3,705,012
METHOD AND APPARATUS FOR MEASURING
THE PEROXIDE CONTENT OF FATS
Ralph A. Marmor and Lawrence C. Brandberg, Minneapolis, Minn., assignors to The Pillsbury Company, Minneapolis, Minn.
Filed May 18, 1970, Ser. No. 38,284
Int. Cl. G01m 21/06, 31/22, 33/02
U.S. Cl. 23—230 R     3 Claims

ABSTRACT OF THE DISCLOSURE

A fat solvent is placed within one compartment of a test receptacle; a solution of an indicator and sodium thiosulfate is contained in a second compartment. A predetermined amount of potassium iodide is added to the solvent. The fat is then mixed with the solvent. Finally, the mixture of fat and solvent is mixed with the sodium thiosulfate and indicator solution. The presence of a deep blue color indicates a peroxide value above that which is usable.

---

The present invention relates to a system for measuring the peroxide content of a fat and more specifically to a test method and apparatus for measuring peroxide value by providing a predetermined amount of color indicator and a substance that reacts with peroxide to form a compound which will produce a color reaction when exposed to the indicator.

The rancidity of cooking fats and oils has been a longstanding problem. Rancidity is particularly objectionable in connection with the commercial preparation of food products in bakeries, restaurants, or other establishments in which deep-fat frying of foods such as French fried potatoes or doughnuts is done. In one prior test for measuring products of fat oxidation, the free iodine is titrated with a predetermined quantity of a reducing agent such as sodium thiosulfate and then exposed to a color indicator.

The prior test for measuring rancidity is conducted by determining the peroxide content of the fat, e.g., in American Oil Chemists' Society Standard Test No. CD8–53. This test is, however, complicated and time-consuming to perform, requires the use and possibly spilling of toxic materials, must be performed by a trained technician or chemist who is skilled in the use of a burette required for titration. Moreover, mathematical computations are required to arrive at the desired information.

In view of the deficiencies of the prior art, it is an object of the present invention to provide an improved peroxide test which does not require the skill of a trained technician, can be easily and quickly performed with safety by cooks or other semiskilled persons in restaurants and drive-ins, bakeries, and the like by means of a simply constructed disposable test instrument.

These and other more detailed and specific objects will be apparent in view of the following specification and claims wherein:

FIG. 1 is a perspective view of an apparatus embodying the invention.

FIG. 2 is a vertical sectional view taken on line 2—2 of FIG. 1.

Briefly, a receptacle is provided with at least two compartments, one containing a fat solvent and the other an aqueous solution of sodium thiosulfate and a starch indicator. The test is conducted by adding a predetermined amount of an alkali metal iodide salt such as potassium iodide to the fat solvent. Next, a predetermined amount of fat is mixed with the solvent. The mixture of fat and solvent is then mixed with the sodium thiosulfate and indicator solution. The presence of a deep blue color indicates a peroxide value above that which is usable.

In the accomplishment of the foregoing and related ends, the invention then comprises the features hereinafter fully described and particularly pointed out in the claims, the following description setting forth in detail certain illustrative embodiments of the invention, these being indicative, however, of but a few of the various ways in which the principles of the invention may be employed.

In accordance with the present invention, a source of iodine ions such as an alkali metal iodine salt, e.g., potassium iodide, is dissolved in a polyol, such as a substituted glycol, e.g., a methylene glycol, ethylene glycol, propylene glycol, butylene gycol, or the like. It was discovered that such a solution is stable during storage for a period of at least six months. About 0.5 to 1.0 milliliter of a saturated potassium iodide solution is preferably stored in one chamber of a mixing receptacle to be described below.

In another compartment within the receptacle is stored the fat solvent together with an acid. In a third compartment is stored a solution of a predetermined amount of sodium thiosulfate together with an indicator such as starch for producing a visible color reaction in the presence of free iodine. The free iodine, liberated by the peroxide present, is titrated with the sodium thiosulfate as shown in the following reaction:

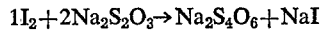

$$1I_2 + 2Na_2S_2O_3 \rightarrow Na_2S_4O_6 + NaI$$

From the equation it can be seen that free iodine must be present in an amount in excess of that which is titrated by the sodium thiosulfate present in order for the blue color action to be shown.

A preferred method and test apparatus will now be described with reference to FIGS. 1 and 2. As seen in the figure, the apparatus is indicated generally by the numeral 10. It is composed of an outer tube 12 formed from glass or other transparent material within which is mounted concentrically an inner transparent tube 14 formed from the same material being somewhat longer than tube 12 so as to project upwardly beyond the upper end of tube 12. Between tube 12 and 14 is a space that defines a first material storage compartment. The chamber within tube 14 defines a second storage compartment. Frictionally fitted over the top of tube 12 is a cap 16 composed of a suitable material, such as a plastic resin, e.g., Teflon, having a bore 18 adapted to slide frictionally onto and seal the top of tube 12 and a central bore 20 adapted to securely engage the outer surface of tube 14 and form a liquid-type seal therewith. The lower ends of both of the tubes 12 and 14 are sealed by a bottom closure 22 having an outer bore 24 of the proper size to form a tight sliding fit around the outside surface of the lower end of the tube 12. A raised section in the center of the closure 22 is provided with a slightly tapered wall 26 adapted to form a tight seal against the inside surface of tube 14. The closure 22 can be formed from a chemically inert substance such as Teflon.

The upper end of tube 14 is closed by means of a dispensing cap 28 including a flexible dome-shaped top wall 28a having a centrally disposed downwardly projecting retaining lub 28b at its center. Snap-fitted over the lower end of the retaining lug 28b is a valve 29, which is normally held upwardly against the seat 29a by the resilience of the dome 28a to thereby securely seal the storage compartment 28d within which is stored the saturated potassium iodide solution. The cap 28 is provided with a connecting portion 30 adapted to form a tight sliding fit within the upper end of tube 14.

A tube 14 contains a solvent solution 32 composed of 60 percent glacial acetic acid and 40 percent chloroform while the tube 12 contains a solution 34 composed of sodium thiosulfate and a starch indicator.

To conduct the test, the flexible dome 28a is depressed opening the valve 29. The potassium iodine solution is mixed with the solution 32 by shaking the container. Five milliliters of oil are then added to solution 32 and allowed to stand for one minute at which time the tube 14 is drawn upwardly through the bore 20 which in effect removes a barrier between the interior of tube 14 and the compartment containing solution 34 thus allowing the contents thereof to mix with the solution 34. A blue color indicates a peroxide value above a predetermined amount, in this case a peroxide value above 5.

The invention will be better understood by reference to the following examples.

EXAMPLE I

One milliliter of a saturated solution composed of potassium iodide in propylene glycol is placed in compartment 28d. The solution 32 placed in tube 14 consists of 30 milliliters of 60 percent glacial acetic acid and 40 percent chloroform. The solution 34 within tube 12 consists of the equivalent of 2.5 milliliters of 1/10 normal sodium thiosulfate solution and 30 milliliters of water to provide a measurement for establishing a peroxide value of 5.

Tests are conducted as described above. The test takes about one minute and can be performed by unskilled operators. A bright blue color indicates a peroxide value above 5.

EXAMPLE II

Peroxide value tests are conducted as in Example I except that 5 milliliters of 1/10 normal sodium thiosulfate are added to 30 milliliters water to provide the indicator solution for establishing peroxide values above 10.

We claim:
1. A method of determining the peroxide content of a fat comprising providing a tubular receptacle formed from a rigid material, a rigid hollow tube slidably mounted in spaced relationship therewithin to define two concentric compartments and a sealing means closing one end of the inner tube, providing a fat solvent in one of the compartments together with an acid, providing in the other compartment a solution containing an indicator adapted to exhibit a characteristic color in the presence of free iodine and a predetermined amount of a reducing agent, adding an iodine salt to the fat solvent, mixing a measured amount of said fat with the solvent and the iodine salt, thereafter mixing the solution containing the fat with the color indicator by sliding one tube axially relative to the other away from the sealing means to allow communication between the compartments through said end of the inside tube to demonstrate the presence of free iodine by assuming said characteristic color, the amount of free iodine present, if any, being determined by the quantity of iodine titrate by the said predetermined amount of reducing agent whereby the presence of said characteristic color indicates that free iodine is present in excess of the amount titrated by the quantity of reducing agent present.

2. The method of claim 1 wherein a third compartment is provided within the receptacle, the solution of said iodine salt is placed in the third compartment and said iodine salt solution is transferred to the fat solvent from said third compartment prior to mixing the fat with the solvent.

3. The method of claim 1 wherein a third compartment is provided containing a predetermined quantity of an alkali metal iodide salt, said salt is emptied from the third compartment to the compartment containing the fat solvent and said barrier is removed between the fat solvent and the indicator solution after the fat has been introduced into the solvent.

References Cited

UNITED STATES PATENTS

| | | | |
|---|---|---|---|
| 3,476,515 | 11/1969 | Johnson | 23—230 R |
| 3,451,540 | 6/1969 | Kulischenko | 206—47 A |
| 3,497,320 | 2/1970 | Blackburn et al. | 23—230 R |
| 3,504,376 | 3/1970 | Bednar et al. | 23—230 R |
| 3,036,894 | 5/1962 | Forestiere | 23—253 TP |

OTHER REFERENCES

Stansby, M. E., Analytical Chemistry, vol. 13, pp. 627–31 (1941).

MORRIS O. WOLK, Primary Examiner

E. A. KATZ, Assistant Examiner

U.S. Cl. X.R.

23—253 R, 259